(12) United States Patent
Cheng et al.

(10) Patent No.: US 10,361,926 B2
(45) Date of Patent: Jul. 23, 2019

(54) LINK PREDICTION WITH SPATIAL AND TEMPORAL CONSISTENCY IN DYNAMIC NETWORKS

(71) Applicant: NEC Laboratories America, Inc., Princeton, NJ (US)

(72) Inventors: Wei Cheng, Princeton Junction, NJ (US); Haifeng Chen, West Windsor, NJ (US)

(73) Assignee: NEC Corporation (JP)

( * ) Notice: Subject to any disclaimer, the term of this patent is extended or adjusted under 35 U.S.C. 154(b) by 53 days.

(21) Appl. No.: 15/890,747

(22) Filed: Feb. 7, 2018

(65) Prior Publication Data

US 2018/0254958 A1    Sep. 6, 2018

Related U.S. Application Data

(60) Provisional application No. 62/466,475, filed on Mar. 3, 2017.

(51) Int. Cl.
*H04L 12/24* (2006.01)
*H04L 12/751* (2013.01)

(52) U.S. Cl.
CPC ............ *H04L 41/147* (2013.01); *H04L 41/12* (2013.01); *H04L 41/142* (2013.01); *H04L 45/02* (2013.01); *H04L 41/024* (2013.01); *H04L 41/16* (2013.01)

(58) Field of Classification Search
CPC ..... H04L 41/024; H04L 41/12; H04L 41/142; H04L 41/147; H04L 41/16; H04L 45/02
See application file for complete search history.

(56) References Cited

U.S. PATENT DOCUMENTS

2017/0272972 A1*    9/2017   Egner ............... H04W 28/0268

OTHER PUBLICATIONS

Aggarwal et al., "Evolutionary Network Analysis: A Survey," ACM Computing Surveys. vol. 47, No. 1, Article 10. Apr. 2014. pp. 1-36.
Dunlavy et al., "Temporal Link Prediction Using Matrix and Tensor Factorizations," ACM Transactions on Knowledge Discovery from Data. vol. 5, No. 2, Article 10. Feb. 2011. pp. 1-27.

(Continued)

*Primary Examiner* — Steven H Nguyen
(74) *Attorney, Agent, or Firm* — Joseph Kolodka

(57) ABSTRACT

A computer-implemented method executed by at least one processor for performing link prediction with spatial and temporal consistency by employing a time-dependent matrix factorization technique is presented. The method includes developing, at a plurality of timestamps, relational data of a sequence of network structures each including a plurality of nodes and learning, by the at least one processor, a feature vector of each node of the plurality of nodes of the sequence of network structures by concurrently optimizing a temporal fitting constraint and a network propagation constraint. The method further includes determining a network structure at each timestamp, determining evolutionary patterns at each timestamp, and predicting links in a future network structure based on an evolution of the sequence of network structures within a user-defined sliding window by reducing time complexities of finding neighbors of each node of the plurality of nodes of the sequence of network structures.

20 Claims, 9 Drawing Sheets

(56) References Cited

OTHER PUBLICATIONS

Hasan et al., "A Survey of Link Prediction in Social Networks," Social Network Data Analytics. Chapter 9, Social Network Data Analytics. Springer, Boston MA. 2011 pp. 243-275.
Kashima et al., "A Fast Semi-supervised Learning Algorithm for Link Prediction," Proceedings of the 2009 Society for Industrial and Applied Mathematics, International Conference on Data Mining. Apr. 30-May 2, 2009. pp. 1-12.
Lu et al., "Link Prediction in Complex Networks: A Survey," Physica A: Statistical Mechanics and its Applications, vol. 390, Issue 6. Preprinted Oct. 6, 2010. pp. 1-44.
Oyama et al., "Cross-temporal Link Prediction," 11th IEEE International Conference on Data Mining. Dec. 11-14, 2011. pp. 1188-1193.
Sarkar et al., "Nonparametric Link Prediction in Dynamic Networks," Proceedings of the 29th International Conference on Machine Learning. Jun. 27-Jul. 3, 2012. pp. 1-8.
Tylenda et al., "Towards Time-aware Link Prediction in Evolving Social Networks," The 3rd SNA-KDD Workshop 2009. Jun. 28, 2009. pp. 1-10.
Yu et al., "Temporally Factorized Network Modeling for Evolutionary Network Analysis," WSDM 2017. Feb. 6-10, 2017. pp. 455-464.
Zhou et al., "Learning with Local and Global Consistency," Advances in Neural Information Processing Systems 16. Jan. 1, 2003. pp. 1-8.

\* cited by examiner

LINK PREDICTION WITH SPATIAL AND TEMPORAL CONSISTENCY IN DYNAMIC NETWORKS

RELATED APPLICATION INFORMATION

This application claims priority to Provisional Application No. 62/466,475, filed on Mar. 3, 2017, incorporated herein by reference in its entirety.

BACKGROUND

Technical Field

The present invention relates to dynamic networks and, more particularly, to link prediction with spatial and temporal consistency in dynamic networks.

Description of the Related Art

Evolutionary network analysis has become increasingly important in recent years. One effort relates to temporal link prediction which is employed to predict a future network structure based on a sequence of observed networks. Extensive research efforts have been devoted to the temporal link prediction task including non-parametric and parametric models. The factors in executing a link prediction task in temporal networks are spatial and temporal consistencies, which indicate that a node has a higher probability to form a link with a nearby node than with a remote node in the near future and that a network usually evolves smoothly over time. The first factor is akin to that in static network link prediction and encodes local network propagation constraints from a network topology at each timestamp. The second factor globally enforces smoothness of network evolution over time. Existing approaches, however, seldom unify these two factors to strive for the spatial and temporal consistency in a dynamic network.

SUMMARY

A computer-implemented method executed by at least one processor for performing link prediction with spatial and temporal consistency by employing a time-dependent matrix factorization technique is presented. The method includes developing, at a plurality of timestamps, relational data of a sequence of network structures each including a plurality of nodes and learning, by the at least one processor, a feature vector of each node of the plurality of nodes of the sequence of network structures by concurrently optimizing a temporal fitting constraint and a network propagation constraint. The computer-implemented method further includes determining a network structure at each timestamp of the plurality of timestamps, determining evolutionary patterns at each of the plurality of timestamps, and predicting links in a future network structure based on an evolution of the sequence of network structures within a user-defined sliding window by reducing time complexities of finding neighbors of each node of the plurality of nodes of the sequence of network structures.

A system for performing link prediction with spatial and temporal consistency by employing a time-dependent matrix factorization technique is also presented. The system includes a memory and a processor in communication with the memory, wherein the processor is configured to develop, at a plurality of timestamps, relational data of a sequence of network structures each including a plurality of nodes and learn, by the at least one processor, a feature vector of each node of the plurality of nodes of the sequence of network structures by concurrently optimizing a temporal fitting constraint and a network propagation constraint. The system further includes a memory and a processor in communication with the memory, wherein the processor is configured to determine a network structure at each timestamp of the plurality of timestamps, determine evolutionary patterns at each of the plurality of timestamps, and predict links in a future network structure based on an evolution of the sequence of network structures within a user-defined sliding window by reducing time complexities of finding neighbors of each node of the plurality of nodes of the sequence of network structures.

A non-transitory computer-readable storage medium comprising a computer-readable program is presented for performing link prediction with spatial and temporal consistency by employing a time-dependent matrix factorization technique, wherein the computer-readable program when executed on a computer causes the computer to perform the steps of developing, at a plurality of timestamps, relational data of a sequence of network structures each including a plurality of nodes, learning, by the at least one processor, a feature vector of each node of the plurality of nodes of the sequence of network structures by concurrently optimizing a temporal fitting constraint and a network propagation constraint, determining a network structure at each timestamp of the plurality of timestamps, determining evolutionary patterns at each of the plurality of timestamps, and predicting links in a future network structure based on an evolution of the sequence of network structures within a user-defined sliding window by reducing time complexities of finding neighbors of each node of the plurality of nodes of the sequence of network structures.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
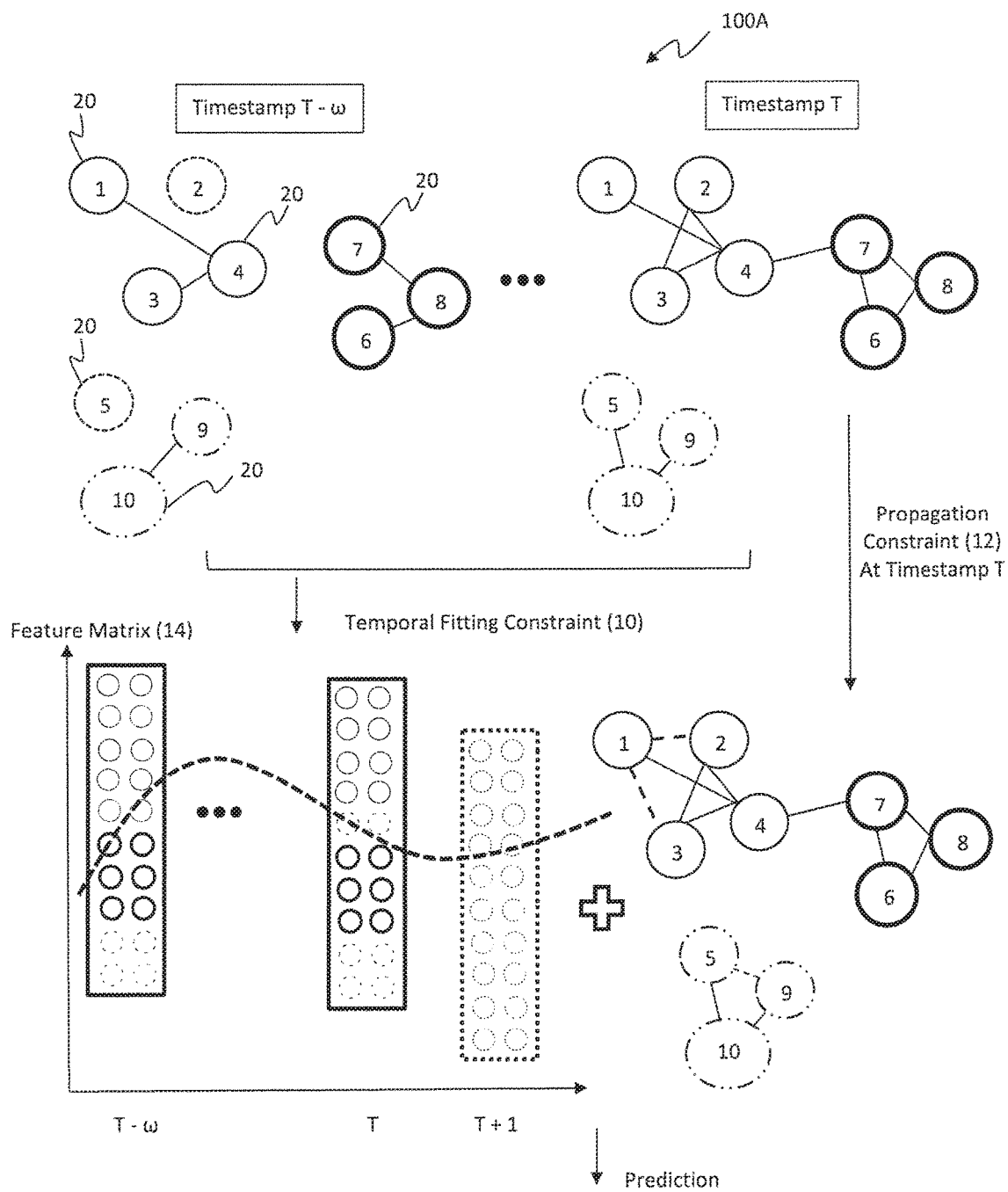
FIG. 1 is a block/flow diagram illustrating an input and processing of a link prediction model with spatial and temporal consistency, in accordance with embodiments of the present invention.

In the exemplary embodiments of the present invention, dynamic networks are introduced. One aspect of dynamic networks is link prediction. Models have been developed to predict links that can emerge in the immediate future from the past evolution of the networks. Link prediction is based on two factors. The first factor is that a node is more likely to form a link in the near future with another node within its close proximity, rather than with a random node. The second factor is that a dynamic network usually evolves smoothly.

In the exemplary embodiments of the present invention, a link prediction model is presented with spatial and temporal consistency (LIST), to predict links in a sequence of networks over time. LIST characterizes network dynamics as a function of time, which integrates a spatial topology of a network at each timestamp and the temporal network evolution. LIST has at least two advantages compared to conventional techniques. The first advantage is that LIST uses a generic model to express the network structure as a function of time, which makes the LIST model suitable for a wide variety of temporal network analysis problems. The second advantage is that by retaining the spatial and temporal consistency, the LIST model yields better prediction performance.

In the exemplary embodiments of the present invention, the problem of temporal link prediction is defined as follows. Given a sequence of networks from timestamps 1 through T, the task is to predict link weights at timestamp T+α, where α≥1. Note that a special case of this definition is to predict whether a new link emerges or not (e.g., when the link weight is restricted to be either 0 or 1).

In the exemplary embodiments of the present invention, a model for link prediction with spatial and temporal consistency is presented. The time-dependent matrix factorization technique is leveraged, which has shown to be a powerful tool for characterizing dynamic structural data, to decompose the network adjacency matrices into time-dependent matrices that capture the features of vertices (or nodes) in the dynamic networks. At the same time, the network propagation constraint is presented, which ensures vertices (or nodes) to be within close proximity to their neighbors in the hidden feature space to be learned by the time-dependent matrix factorization.

In the exemplary embodiments of the present invention, the feature vector of each vertex is learned by simultaneously or concurrently optimizing a temporal fitting constraint and a network propagation constraint. The temporal fitting constraint can be expressed as a time-dependent matrix factorization with a network adjacency matrix, while the propagation constraint preserves or maintains similarities between the connected pairs of vertices (or nodes) in a feature space. The learned feature matrices are parameterized with time and can be employed to reconstruct the network structure at any given timestamp t. This allows for more general predictions to be made. Additionally, this feature matrix can be viewed as a complete profile of the network dynamics over time, which can also find its utility in other application settings of evolutionary network analysis.

In the exemplary embodiments of the present invention, spatial and temporal consistency in link prediction is achieved, computational speed-up is enabled, and empirical improvements over previous methods is accomplished.

Regarding spatial and temporal consistency in link prediction, a temporal link prediction model (LIST) in dynamic networks is introduced, which simultaneously or concurrently considers a network structure at each timestamp and an evolutionary pattern across all timestamps of a sequence of structured networks. A network propagation constraint is leveraged, which ensures that connected vertices (or nodes) have similar feature vectors. This "locality preserving" property captures the spatial structure of networks at each timestamp. The feature vector of each vertex (or node) can be learned via time-dependent matrix factorization across all recent timestamps, which reveals the temporal structure of networks. Regarding computational speed-up, an efficient algorithm is developed to learn the LIST model which reduces a time complexity from $O(n^3)$ to $O(mn+n^2)$, where n is the number of vertices (or nodes) in the dynamic network, and m is a number of non-zero entries in the network adjacency matrix. This makes the LIST model described herein applicable to various types of large scale datasets.

Figure 2:
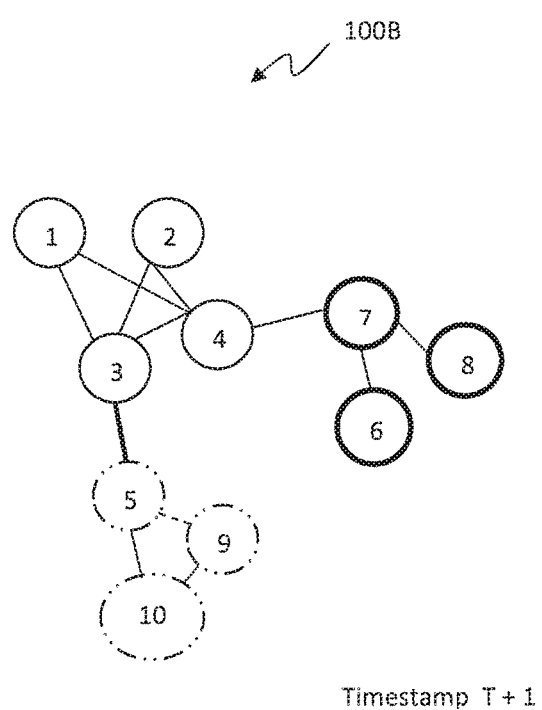
FIG. 2 is a block/flow diagram illustrating an output of the link prediction model with spatial and temporal consistency of FIG. 1, in accordance with embodiments of the present invention.

FIG. 1 is a block/flow diagram illustrating an input and processing 100A of a link prediction model with spatial and temporal consistency, in accordance with embodiments of the present invention whereas FIG. 2 is a block/flow diagram illustrating an output 100B of the link prediction model with spatial and temporal consistency of FIG. 1, in accordance with embodiments of the present invention.

The feature vector of each vertex or node 20 is learned by simultaneously or concurrently optimizing the temporal fitting constraint 10 and the network propagation constraint 12. The temporal fitting constraint 10 can be expressed as a time-dependent matrix 14 factored with a network adjacency matrix, while the network propagation constraint 12 preserves or maintains similarities between the connected pairs of vertices (or nodes) 20 in the feature space. The learned feature matrices are parameterized with time and can be used to reconstruct the network structure at any given timestamp t. This allows for more general predictions to be made. Additionally, the feature matrix 14 can be viewed as a complete profile of the network dynamics over time, which can also find utility in other application settings of evolutionary network analysis.

Figure 3:
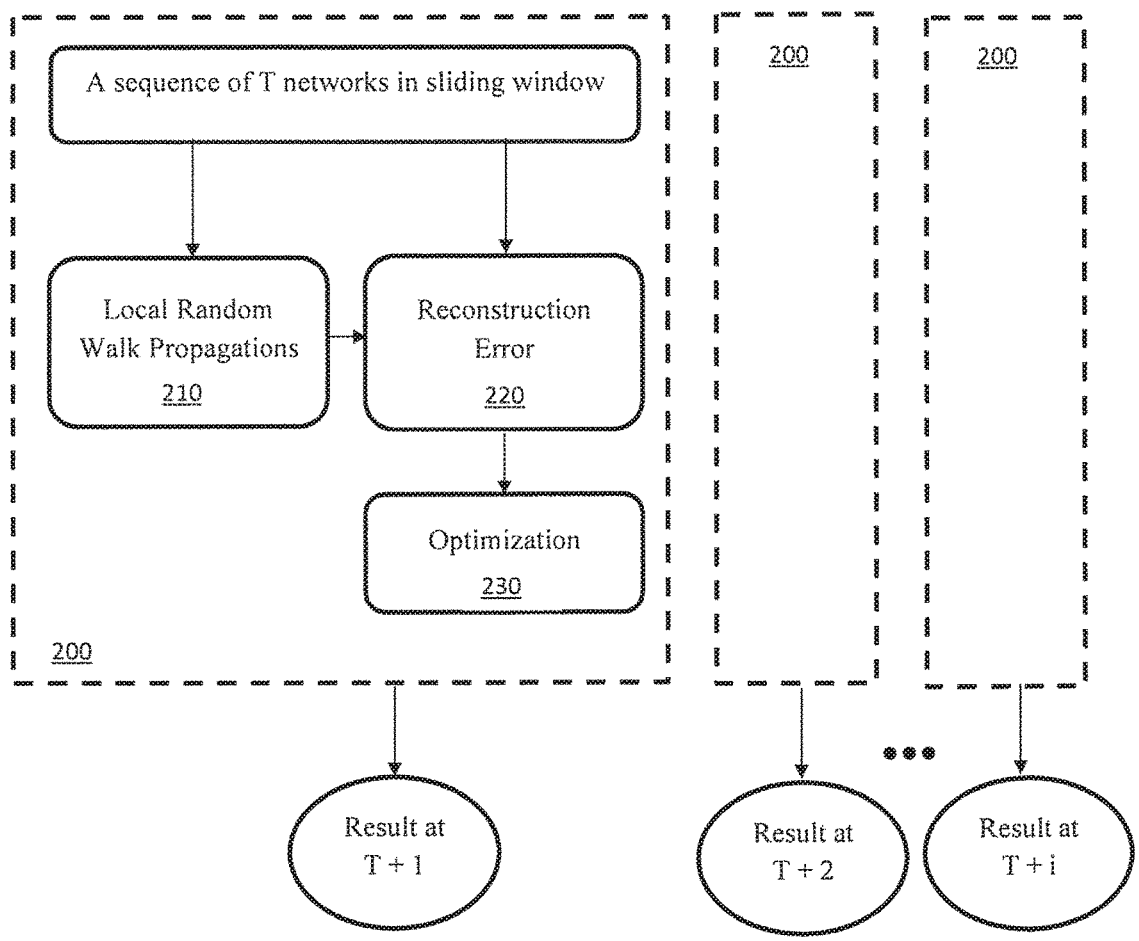
FIG. 3 is a block/flow diagram illustrating link prediction in a dynamic network, in accordance with embodiments of the present invention.

FIG. 3 illustrates link prediction in one or more sliding windows 200.

Regarding local random walk propagations 210, let an observed sequence of temporal networks be $G(t)=(N, A(t))$, where N is a set of vertices, and A(t) is an adjacency matrix of the network at timestamp $t \in [1, T]$, which is defined as a function of time.

The size of a vertex set is assumed to be $|N|=n$, and therefore $A(t) \in \mathbb{R}^{n \times n}$. The element $a_{ijt}$ of A(t) is a link weight between vertices i and j at timestamp t.

The goal is to predict the links at timestamp T+α given $A(1), A(2), \ldots, A(T)$.

A label propagation principle is adopted, which states that two vertices similar to each other are likely to have the same label.

A practical assumption can be made that two vertices (or nodes) that are connected are likely to have similar features. Under this assumption, each vertex (or node) adjusts its feature vector based on its neighbors feature vector.

Thus, suppose that an initial feature vector of vertex i is $v_i(t)$ and a final state is $f_i(t)$ at timestamp t. Then a propagation process from $v_i(t)$ to $f_i(t)$ can be modeled by the following optimization problem.

$$\min_{f(t)} \lambda \sum_{i,j} A_{ij}(t) \left\| \frac{1}{\sqrt{D_{ii}(t)}} f_i(t) - \frac{1}{\sqrt{D_{jj}(t)}} f_j(t) \right\|_2^2 + (1-\lambda) \sum_i \|f_i(t) - v_i(t)\|^2 \qquad (1)$$

where $D(t) \in \mathbb{R}^{n \times n}$ is a degree matrix of A(t).

$\lambda \in (0, 1)$ is a regularization weight.

The first term is the smoothness constraint 12, which enforces neighboring vertices to have similar feature vectors. The second term is the fitting constraint 10, which penalizes large deviation from the initial feature vectors.

The above equation can be written in a matrix form as follows:

$$\min_{f(t)} \lambda f_i(t)^T (I - \overline{A}(t)) f_i(t) + (1-\lambda) \|f_i(t) - v_i(t)\|_F^2 \qquad (2)$$

where $I \in \mathbb{R}^{n \times n}$ is the identity matrix.

$\overline{A}(t)$ is the normalized version of A(t) which is defined as $\sqrt{D(t)} A(t) \sqrt{D(t)}$.

The analytical solution of Eq. (2) is:

$$f_i(t) = (1-\lambda)(I - \lambda \overline{A}(t))^{-1} v_i(t) \qquad (3)$$

This explicit solution shows that the final feature vector is a transformation of the initial one based on the network structure at timestamp t.

Regarding the reconstruction error 220, $f_i(t)$ is determined as follows.

In the exemplary embodiments of the present invention, the time-dependent matrix factorization method is leveraged, which naturally expresses the evolving network by learning a low rank representation of the underlying adjacency matrix.

The exemplary embodiments focus on undirected networks. However, one skilled in the art can contemplate other types of networks, such as, but not limited to, directed networks.

In this case, a symmetric adjacency matrix A(t) can be reconstructed by the feature vectors $\{f_i(t)\}_{i=1}^n$, $$A(t) = F(t)F(t)^T \qquad (4)$$

Here $F(t) = [f_1, f_2, \ldots, f_n] \in \mathbb{R}^{n \times k}$ is a time-depend feature matrix.

A standard approach is then followed to set up a least squares optimization problem so that A(t) and $F(t)F(t)^T$ are as close as possible.

This can be achieved by minimizing the Euclidean distance between all entries in A(t) and $F(t)F(t)^T$.

Therefore, the optimization problem can be written as:

$$\min_F \sum_{t=max(1,T-\omega)}^T \frac{h(t)}{2} \|A(t) - F(t)F(t)^T\|_F^2 \qquad (5)$$

Here, $h(t) = e^{-\theta(T-t)}$ is an exponential decay function with time t that regulates the importance of a current timestamp of a structured network with respect to the past or previous timestamps of structured networks.

ω is the sliding window size which only takes the recent ω timestamps into consideration. This is pragmatic because there is no need to store all network timestamps.

As can be seen from Eq. (5), in order to learn F(t), the time-dependent form of this matrix is regulated. For instance:

Let $P(t) = (1-\lambda)(I - \lambda \overline{A}(t))-1$.

Then $F(t) = P(t)V(t)$ based on Eq. (3).

Subsequently, the optimization problem described by Eq. (5) has the following form:

$$\min \sum_{t=max(1,T-\omega)}^T \frac{h(t)}{2} \|A(t) - P(t)V(t)V(t)^T P(t)^T\|_F^2 \qquad (6)$$

Here $V(t) \in \mathbb{R}^{n \times k}$ is a time-dependent matrix including all initial states of $\mathbb{R}^{n \times k}$ vertex feature vectors. $V(t) \in \mathbb{R}^{n \times k}$ characterizes the network dynamics by modeling the changes in a vertex feature space. The function V(t) can take on any canonical form, such as linear models, polynomial models, etc. based on the specific tasks. A polynomial function is selected for V(t) because the method is attempting to fit the network dynamics within a small sliding window of length ω.

Thus, V(t) can be represented as follows:

$$V(t) = W^{(0)} + W^{(1)} t + \ldots + W^{(d)} t^d = \sum_{i=0}^d W^{(i)} t^i \qquad (7)$$

Here $\{W^{(i)}\}_{i=0}^d \in \mathbb{R}^{n \times k}$, $d \in \mathbb{N}_+$.

V(t) is the simple linear function if d=1.

Regarding optimization 230, the challenge of optimizing the objective function defined in Eq. (6) is that the network A(t) could be very large and sparse, and the optimization of a $O(n^2)$ objective function is often too computationally expensive.

Generally, the existence of a link provides more information than the absence of a link which conveys far more noises. Therefore, Eq. (6) should be tuned up to focus on the non-zero entries in the adjacency matrix A(t).

Let m be the number of non-zero entries in A(t). It is noted that a sample of zero entries is still needed to properly train the model.

In the exemplary embodiments of the present invention, the sample size is set to be equal to the size of non-zero entries m.

Let S(t) be a sample indices at timestamp t such that $a_{ijt} = 0$, $\forall (i,j) \in S(t)$.

Let E(t) be a set of indices that need to be optimize in Eq. (6).

Then $E(t) = \{(i,j) | a_{ijt} > 0\} \cup S(t)$.

Note that a size of E(t) is much smaller than $O(n^2)$ because the networks are often very sparse.

Then the aforementioned objective function can be presented as follows:

$$\sum_{t=max(1,T-\omega)}^{T} \frac{h(t)}{2} \sum_{(i,j)\in E(t)} (a_{ijt} - (P(t)V(t)V(t)^T P(t)^T)_{ij})^2 \quad (8)$$

For directed networks, A(t) can be decomposed into two matrices:
a constant matrix U and a time-dependent matrix V(t), both are n×k matrices.
In this case, the optimization problem comes to be:

$$\sum_{t=max(1,T-\omega)}^{T} \frac{h(t)}{2} \sum_{(i,j)\in E(t)} (a_{ijt} - (UV(t)^T P(t)^T)_{ij})^2 \quad (9)$$

Note that both U and V(t) can be selected to be time-dependent, but such selection doubles the parameter space and increases the model complexity.
Similar results can be achieved if one selects to make U time-dependent rather than V(t).
Model Learning
In this section, the algorithm to learn the LIST model is described. The aforementioned objective function depends on a number of links in the networks.
Weight-decay terms also need to be added to reduce the variance of the LIST model.
Consider the objective function for undirected networks with weight-decay terms:

$$J(W) = \quad (10)$$

$$\sum_{t=max(1,T-\omega)}^{T} \frac{h(t)}{2} \|1_{E(t)}(A(t) - P(t)V(t)V(t)^T P(t)^T)\|_F^2 + \sum_{i=0}^{d} \frac{\beta_i}{2} \|W^{(i)}\|_F^2$$

where, $$1_{E(t)}(M) = \begin{cases} M_{ij} & \text{if } (i,j) \in E(t), \\ 0 & \text{if } (i,j) \notin E(t). \end{cases}$$

$\{\beta_i\}_{i=0}^{d}$ are the weights of the weight-decay terms.
In order to infer parameter W, the symmetric matrix factorization technique is leveraged to compute the derivatives of Eq. (10).
An "error term" $\psi(t)$ is thus introduced for each timestamp t of undirected networks as follows:

$$\psi(t) = 1_{E(t)}(A(t) - P(t)V(t)V(t)^T P(t)^T) \quad (11)$$

Note that the error matrix in $\psi(t)$ has already projected to indices set and defined by E(t).
Consider the derivative calculation of a simplified loss function without timestamp t, then:

$$J = \frac{1}{2}\|A - PVV^T P^T\|_F^2$$

$$= \frac{1}{2}Tr\left((A - PVV^T P^T)(A - PVV^T P^T)^T\right)$$

$$\frac{\partial J}{\partial V} = -P^T APV - P^T A^T PV + 2P^T PVV^T P^T PV$$

$$= -P^T\left((A - PVV^T P^T) + (A - PVV^T P^T)^T\right)PV$$

A common factor $A - PVV^T P^T$ is extracted for each term in J.
The reason is that projection $1_{E(t)}(\bullet)$ can be applied on the common factor.
Therefore:

$$\frac{\partial J(W)}{\partial W^{(i)}} = \frac{\partial J(W)}{\partial V(t)} \frac{\partial V(t)}{\partial W^{(i)}} = \quad (12)$$

$$\sum_{t=max(1,T-\omega)}^{T} h(t)P(t)^T(-\psi(t) - \psi(t)^T)P(t)V(t)t^i + \beta_i W^{(i)}$$

The derivative over W needed to run a gradient descent is thus obtained.
The pseudocode for the LIST model is presented in Algorithm 1 below.

---
Algorithm 1: Algorithm for LIST model

Input: temporal adjacency matrices
 $\{A(t)\}_{t=max(1,T-w)}^{T}$, the order d of V(t) and
 latent dimension k
Output: factor matrices $\{W^{(i)}\}_{i=1}^{d}$ and the prediction A(T + 1).
Set k, d and w.
Randomly initialize $\{W^{(i)}\}_{i=0}^{d}$.
while not stopping criterion do Compute "error term" $\psi(t)$ for each time stamp t.

Compute partial derivatives $\frac{\partial J(W)}{\partial W^{(i)}}$ using $\psi(t)$ by Eq.(12).

Determine the step size λ by line search.

foreach i in {1, ... , d} do

Update $W^{(i)} = W^{(i)} - \lambda \frac{\partial J(W)}{\partial W^{(i)}}$.

Compute prediction result A(T + 1) =

$\left[\left(\sum_{i=0}^{d} W^{(i)}(T+1)^i\right)\left(\sum_{i=0}^{d} W^{(i)}(T+1)^i\right)^T\right]$.

---

Computational Speed-Up
It is observed that an update of W(i) in Algorithm 1 computes an inverse of an n×n matrix $I - \lambda \overline{A}(t)$ which runs in time $O(n^3)$.
In this section, an iterative method is used to approximate the matrix inverse calculation. $\mathbb{R}^{n \times n}$
Given that eigenvalues of $Q \in \mathbb{R}^{n \times n}$ in [−1,1], $0 < \gamma < 1$, and an iteration number B, the inverse of matrix $I - \gamma Q$ can be approximated by summing up $(\gamma Q)^b$ across all iterations, which is:

$$(I - \gamma Q)^{-1} = \lim_{B \to \infty} \sum_{b=1}^{B} (\gamma Q)^{b-1} \quad (13)$$

Given $\lambda \in (0,1)$ and $\overline{A}(t)$ (normalized by degree matrix D(t)), the approximate solution for P(t) is:

$$P(t) = (1-\lambda)(I - \lambda\overline{A}(t))^{-1} = (1-\lambda)\sum_{b=1}^{B} (\lambda\overline{A}(t))^{b-1} \quad (14)$$

Assume that the number of non-zero entries in the sparse matrix $\overline{A}(t)$ is m.

The complexity upper-bound of sparse matrix multiplication is O(mn).

Therefore, the above solution takes O((b−1)mn) in time for each iteration, b∈[1, B], which results in an overall complexity O(B²mn) for the calculation of P(t).

If the computed results in previously iterations are cached, then the time complexity is reduced to O(Bmn).

Complexity Analysis

It is assumed that the gradient-descent method in Algorithm 1 is implemented for M iterations, and the rank of the factorization is k. The bottleneck step is to update all parameters for d+1 matrices in each of these iterations.

It can be seen from Eq. (12) that there are w timestamps within each sliding window, and in each timestamp the complexity for matrix manipulation is O(Bmn)+O(n²k).

Thus, the asymptotic running time is O(Mω(d+1)(Bmn+n²k)). In empirical study settings, M, ω, d, B and k are much smaller than n and m, therefore the time complexity is approximately O(mn+n²).

The ability to predict link weights at a specific time is almost trivial using the LIST model.

Once the factor matrices $\{W^{(i)}\}_{i=1}^{d}$, are obtained, the predicted structure of the network can be effectively reconstructed by $V(T+\alpha)V(T+\alpha)^T$ for any $\alpha \geq 1$.

As the value of α becomes larger and larger, the reconstruction can be expected to become increasingly challenging.

In conclusion, a link prediction model (LIST) has been developed for dynamic networks which simultaneously or concurrently incorporates network propagation and temporal matrix factorization techniques. This is guaranteed by the joint minimization of the network propagation loss and the temporal network reconstruction error. The LIST model utilizes a user-defined sliding window to learn the parameters, and thus supports streaming link prediction as well. The LIST model has the ability to explicitly express the network as a function of time, which takes into account both local (spatial) network structure and global evolving (temporal) patterns. Therefore, the LIST model has the advantage of generality in addressing various temporal applications like temporal network compression and expanding community detection.

Figure 4:
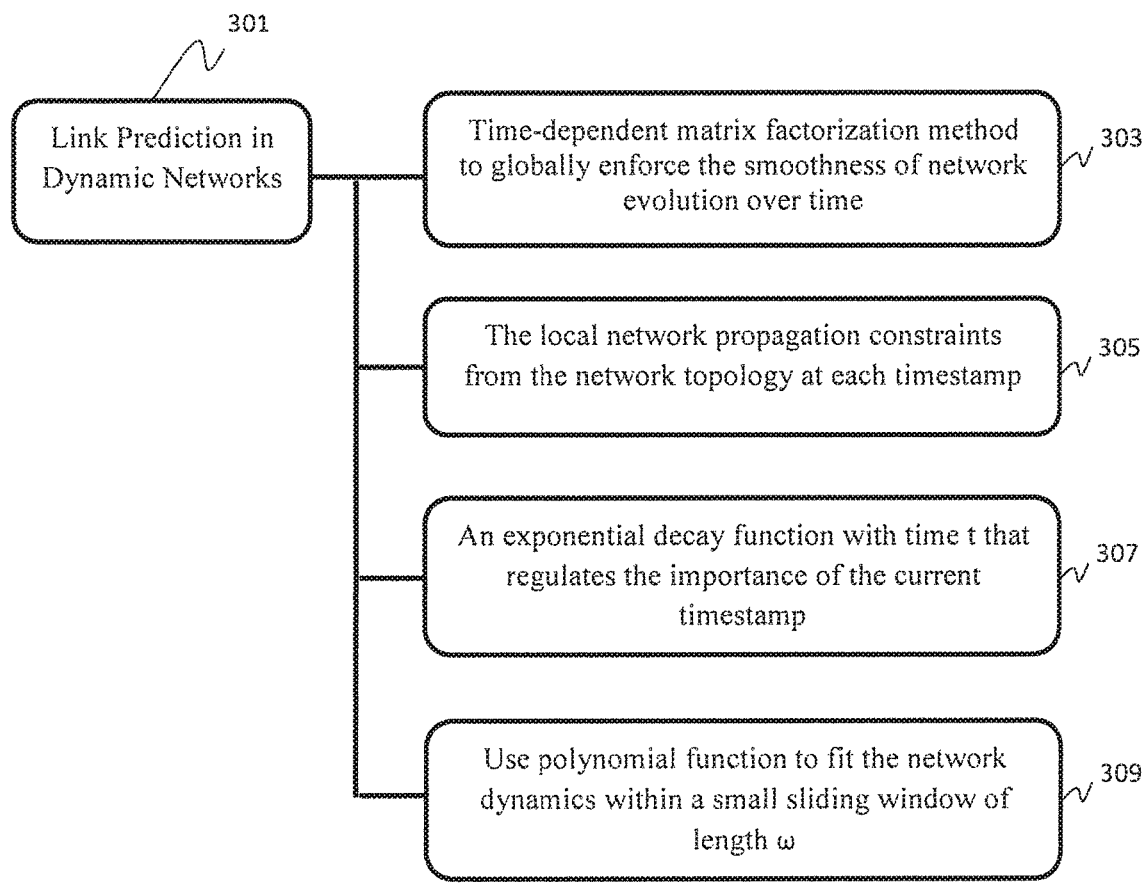
FIG. 4 is a block/flow diagram illustrating a method for predicting links of a dynamic network, in accordance with embodiments of the present invention.

FIG. 4 is a block/flow diagram illustrating a method for predicting links of a dynamic network, in accordance with embodiments of the present invention.

At block 301, link prediction in dynamic networks is employed. Link prediction is employed with spatial and temporal consistency. The time-dependent matrix factorization technique is leveraged, which is a powerful tool for characterizing dynamic structural data to decompose network adjacency matrices into time-dependent matrices that capture the features of vertices (or nodes) in dynamic networks.

At block 303, a time-dependent matrix factorization method is employed to globally enforce the smoothness of network evolution over time. The smoothness constraint enforces neighboring vertices to have similar feature vectors.

At block 305, the local network propagation constraints from the network topology at each timestamp are utilized. The network propagation constraint ensures vertices (or nodes) to be within close proximity to their neighbors in the hidden feature space to be learned by the time-dependent matrix factorization.

At block 307, an exponential decay function with time t is employed that regulates an importance of a current timestamp with respect to previous timestamps.

At block 309, a polynomial function is employed to fit the network dynamics within a small sliding window of length ω. A polynomial function is selected for V(t) because the method is attempting to fit the network dynamics within a small sliding window of length ω.

Figure 5:
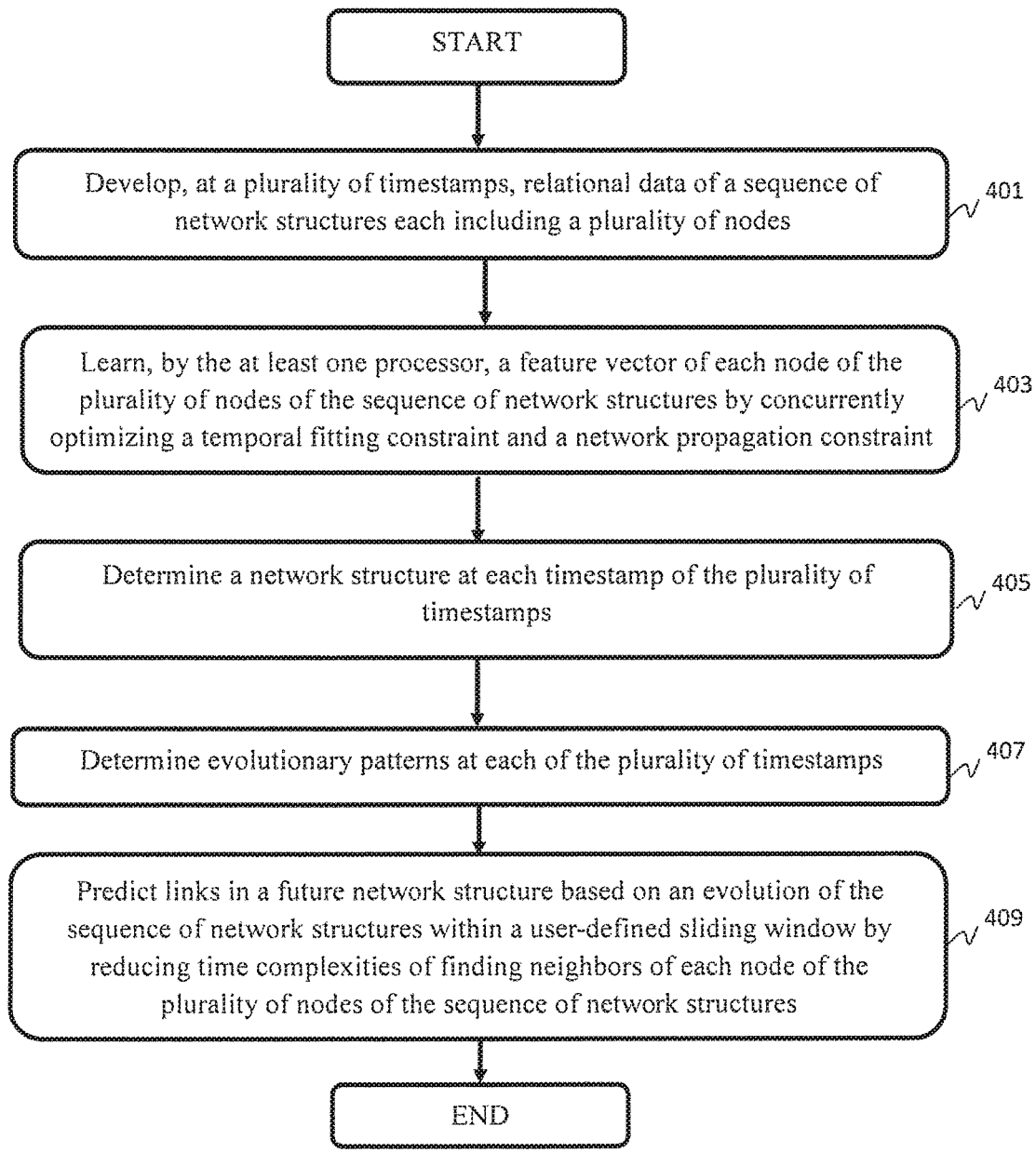
FIG. 5 is a block/flow diagram illustrating a method for learning feature vectors of each node of a plurality of nodes of a sequence of structured networks by concurrently optimizing a temporal fitting constraint and a network propagation constraint, in accordance with embodiments of the present invention.

FIG. 5 is a block/flow diagram illustrating a method for learning feature vectors of each node of a plurality of nodes of a sequence of structured networks by concurrently optimizing a temporal fitting constraint and a network propagation constraint, in accordance with embodiments of the present invention.

At block 401, develop, at a plurality of timestamps, relational data of a sequence of network structures each including a plurality of nodes. The relational data can be connections between the nodes (or vertices). A network is simply a collection of connected objects. The objects are referred to as nodes or vertices, and are usually drawn as points. The connections between the nodes are referred to as edges, and are usually drawn as lines between points.

At block 403, learn, by the at least one processor, a feature vector of each node of the plurality of nodes of the sequence of network structures by concurrently optimizing a temporal fitting constraint and a network propagation constraint. The temporal fitting constraint is expressed as a time-dependent matrix factorization with a network adjacency matrix. The network propagation constraint maintains similarities between connected pairs of nodes in a feature space.

At block 405, determine a network structure at each timestamp of the plurality of timestamps. The learned feature vectors are parameterized with time and employed to reconstruct the network structure of the sequence of network structures at each of the plurality of timestamps.

At block 407, determine evolutionary patterns at each of the plurality of timestamps.

At block 409, predict links in a future network structure based on an evolution of the sequence of network structures within a user-defined sliding window by reducing time complexities of finding neighbors of each node of the plurality of nodes of the sequence of network structures.

Networks can represent all sorts of systems in the real world. For example, the Internet can be described as a network where the nodes are computers or other devices and the edges are physical (or wireless, even) connections between the devices. The World Wide Web is a huge network where the pages are nodes and links are the edges. Other examples include social networks of acquaintances or other types of interactions, networks of publications linked by citations, transportation networks, metabolic networks, communication networks, and Internet of Things (IoT) networks. The exemplary embodiments of the present invention can refer to any such networks without limitation.

Figure 6:
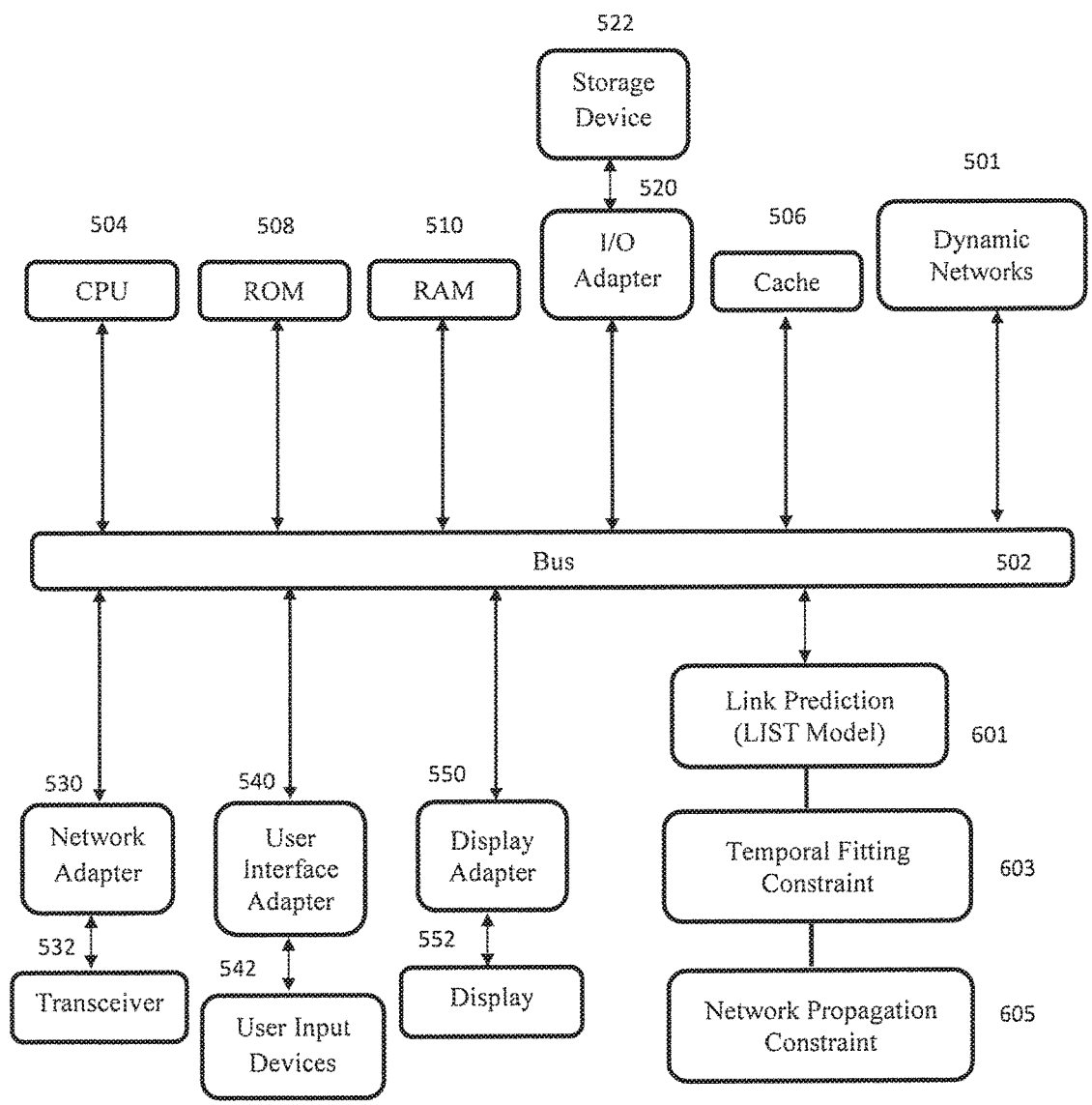
FIG. 6 is an exemplary processing system for performing link prediction with spatial and temporal consistency by employing a time-dependent matrix factorization technique, in accordance with embodiments of the present invention.

FIG. 6 is an exemplary processing system for performing link prediction with spatial and temporal consistency by employing a time-dependent matrix factorization technique, in accordance with embodiments of the present invention.

The processing system includes at least one processor (CPU) 504 operatively coupled to other components via a system bus 502. A cache 506, a Read Only Memory (ROM) 508, a Random Access Memory (RAM) 510, an input/output (I/O) adapter 520, a network adapter 530, a user interface adapter 540, and a display adapter 550, are operatively coupled to the system bus 502. Additionally, a dynamic network 501 and block 601 for employing link prediction are operatively coupled to the system bus 502. The link prediction module 601 employs temporal fitting constraints 603 and network propagation constraints 605.

A storage device 522 is operatively coupled to system bus 502 by the I/O adapter 520. The storage device 522 can be any of a disk storage device (e.g., a magnetic or optical disk storage device), a solid state magnetic device, and so forth.

A transceiver 532 is operatively coupled to system bus 502 by network adapter 530.

User input devices 542 are operatively coupled to system bus 502 by user interface adapter 540. The user input devices 542 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 542 can be the same type of user input device or different types of user input devices. The user input devices 542 are used to input and output information to and from the processing system.

A display device 552 is operatively coupled to system bus 502 by display adapter 550.

Of course, the dynamic network processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the dynamic network processing system are readily contemplated by one of ordinary skill in the art given the teachings of the present invention provided herein.

Figure 7:
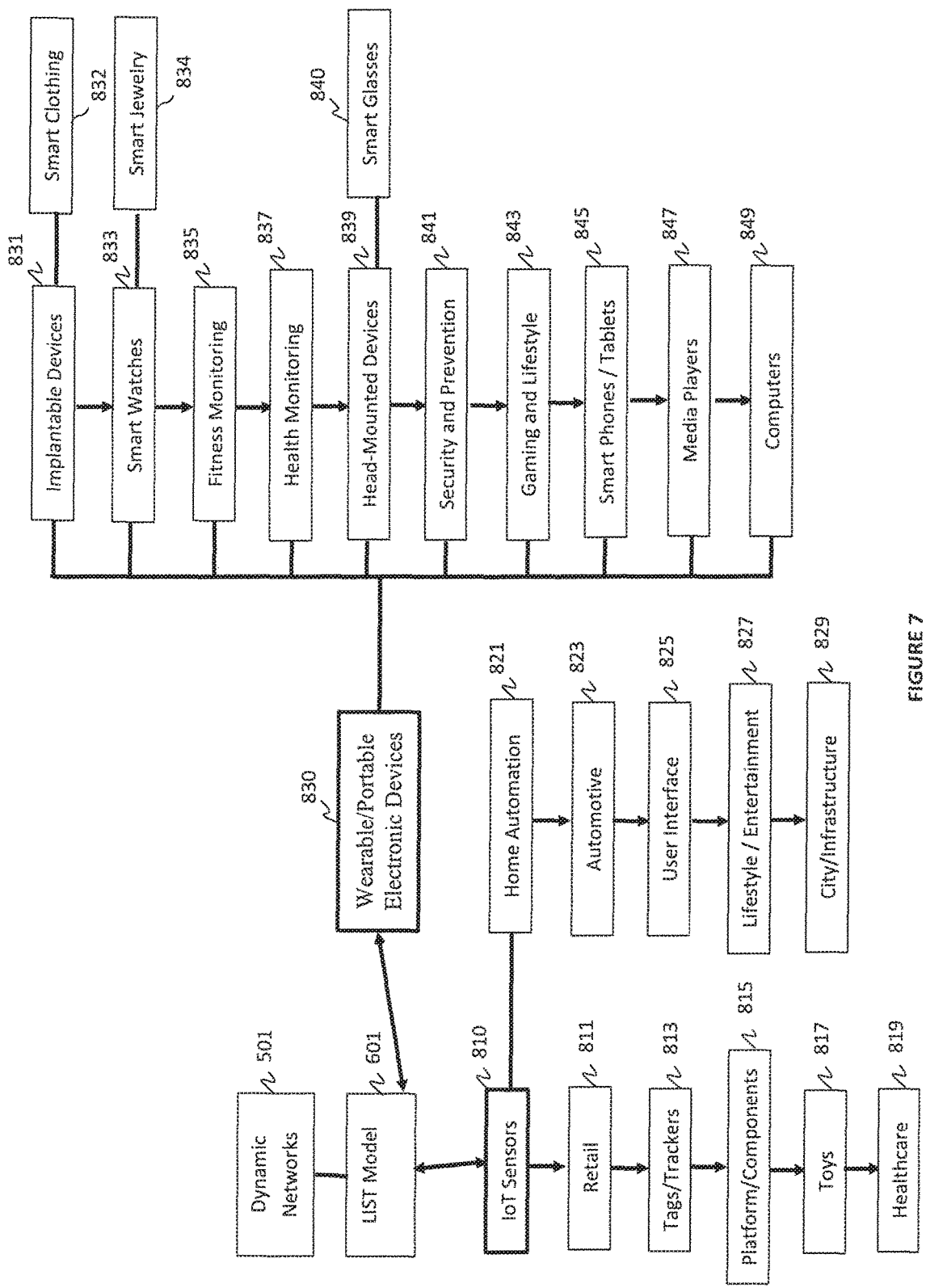
FIG. 7 is a block/flow diagram of a method for performing link prediction in Internet of Things (IoT) systems/devices/infrastructure, in accordance with embodiments of the present invention.

FIG. 7 is a block/flow diagram of a method for performing link prediction in Internet of Things (IoT) systems/devices/infrastructure, in accordance with embodiments of the present invention.

IoT enables advanced connectivity of computing and embedded devices through internet infrastructure. IoT involves machine-to-machine communications (M2M), where it is important to continuously monitor connected machines to detect any anomaly or bug, and resolve them quickly to minimize downtime.

The LIST model 601 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The LIST model or module 601 described herein can be incorporated into any type of electronic devices for any type of use or application or operation.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the LIST model 601 of the present invention can be incorporated into a variety of different devices and/or systems. For example, the LIST model 601 can be incorporated into wearable or portable electronic devices 830. Wearable/portable electronic devices 830 can include implantable devices 831, such as smart clothing 832. Wearable/portable devices 830 can include smart watches 833, as well as smart jewelry 834. Wearable/portable devices 830 can further include fitness monitoring devices 835, health and wellness monitoring devices 837, head-mounted devices 839 (e.g., smart glasses 840), security and prevention systems 841, gaming and lifestyle devices 843, smart phones/tablets 845, media players 847, and/or computers/computing devices 849.

The LIST model 601 of the present invention can be further incorporated into Internet of Thing (IoT) sensors 810 for various applications, such as home automation 821, automotive 823, user interface 825, lifestyle and/or entertainment 827, city and/or infrastructure 829, retail 811, tags and/or trackers 813, platform and components 815, toys 817, and/or healthcare 819. The IoT sensors 810 can communicate with the LIST model 601. Of course, one skilled in the art can contemplate incorporating such LIST model 601 formed therein into any type of electronic devices for any types of applications, not limited to the ones described herein.

Figure 8:
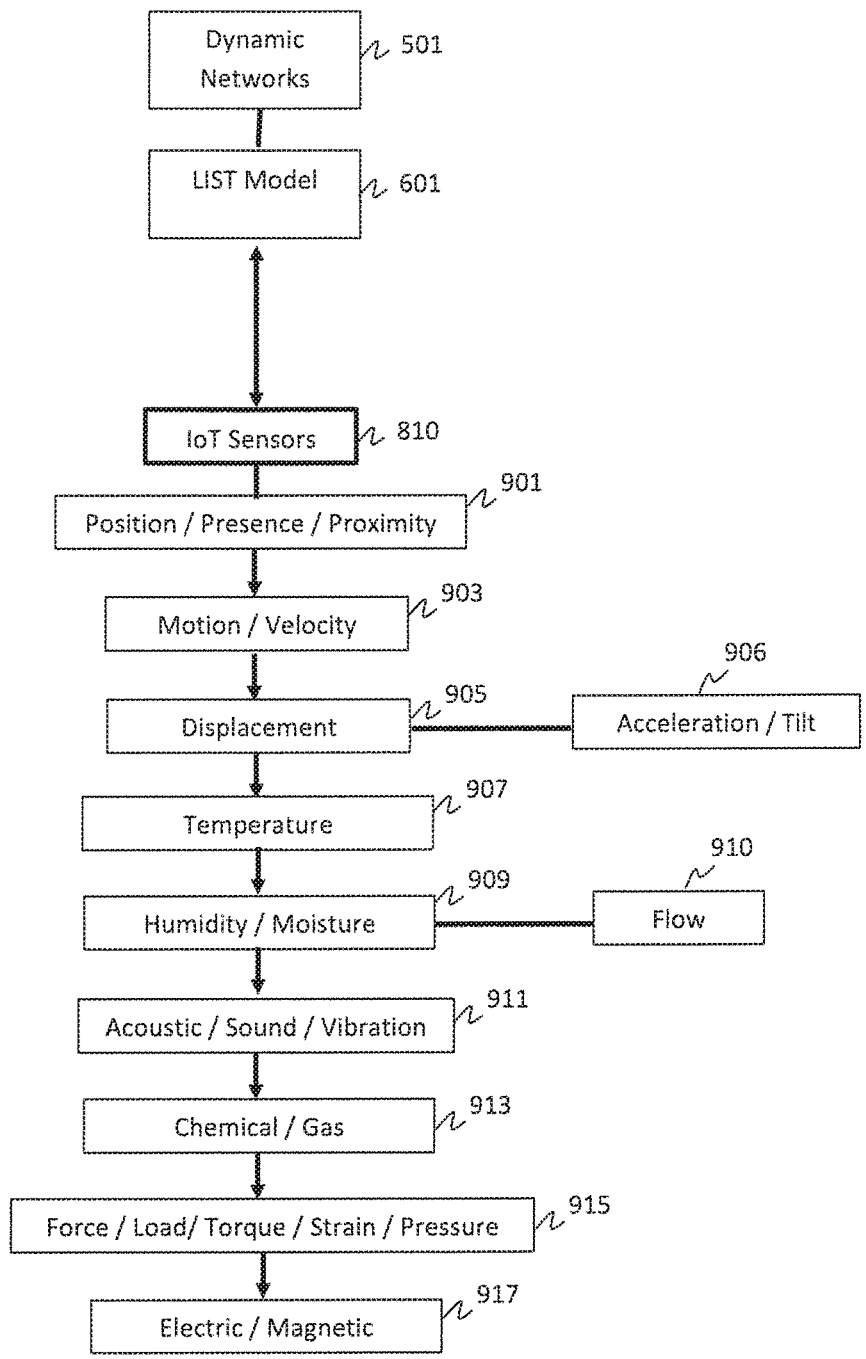
FIG. 8 is a block/flow diagram of exemplary IoT sensors used to collect data/information related to performing link prediction, in accordance with embodiments of the present invention.

FIG. 8 is a block/flow diagram of exemplary IoT sensors used to collect data/information related to performing link prediction, in accordance with embodiments of the present invention.

IoT loses its distinction without sensors. IoT sensors act as defining instruments which transform IoT from a standard passive network of devices into an active system capable of real-world integration.

The IoT sensors 810 can be connected via LIST model 601 to transmit information/data, continuously and in real-time, to any type of dynamic network 501. Exemplary IoT sensors 810 can include, but are not limited to, position/presence/proximity sensors 901, motion/velocity sensors 903, displacement sensors 905, such as acceleration/tilt sensors 906, temperature sensors 907, humidity/moisture sensors 909, as well as flow sensors 910, acoustic/sound/vibration sensors 911, chemical/gas sensors 913, force/load/torque/strain/pressure sensors 915, and/or electric/magnetic sensors 917. One skilled in the art can contemplate using any combination of such sensors to collect data/information and input into the LIST model 601 for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

Figure 9:
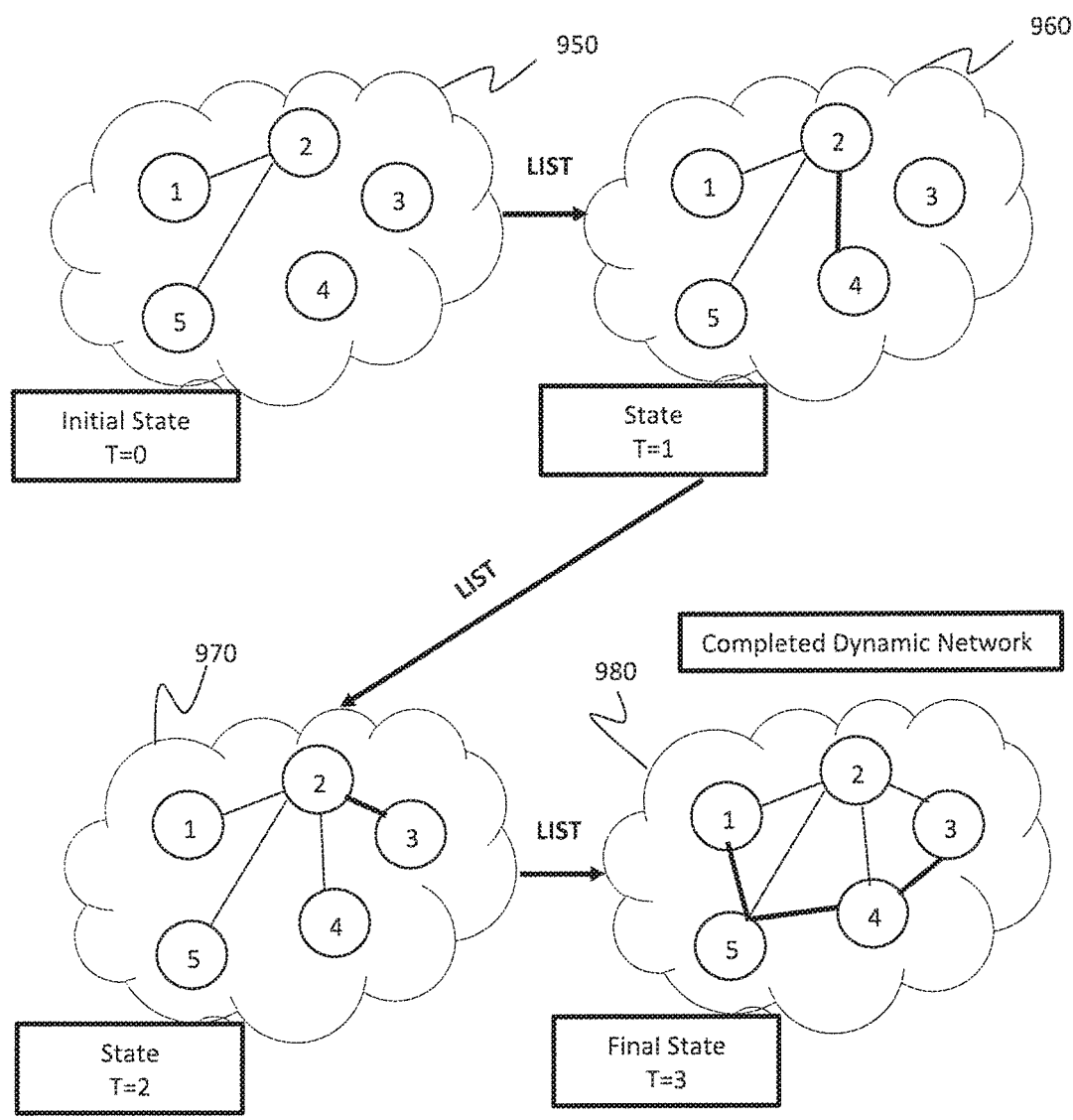
FIG. 9 is a block/flow diagram illustrating a completed dynamic network by using a link prediction model with spatial and temporal consistency (LIST), in accordance with embodiments of the present invention.

FIG. 9 is a block/flow diagram illustrating a completed dynamic network by using a link prediction model with spatial and temporal consistency (LIST), in accordance with embodiments of the present invention.

An initial network 950 includes, e.g., 5 nodes. Nodes 1 and 2 are connected, and nodes 2 and 5 are connected. This initial state is designated as T=0. The LIST model is applied to the initial network 950. As a result of this link prediction iteration, another link is predicted, that is, a connection link between nodes 2 and 4. This state is designated as T=1 and the new network is designated as dynamic network 960. The LIST model is now applied to the new network 960. As a result of this link prediction iteration, another link is predicted, that is, a connection link between nodes 2 and 3. This state is designated as T=2 and the new network is designated as dynamic network 970. The LIST model is now applied to the new dynamic network 970. As a result of this link prediction iteration, more links are predicted, that is, a connection link between nodes 1 and 5, 4 and 5, and 3 and 4. This state is designated as T=3 and is the final state where the final dynamic network 980 is created. Thus, dynamic network 980 is created after a number of iterations using the LIST model. Predictions occur at every stage or state to predict new possible links between nodes of a dynamic network. The temporal fitting constraint 10 and the propagation constraint 12 are applied at each state (FIG. 1) according to the LIST model. Dynamic network 980 is a network that varies over time and has vertices that are often not binary and instead represent a probability for having a link between at least two nodes. Statistical approaches or computer simulations are often necessary to explore how such dynamic networks evolve, adapt or respond to external intervention. The LIST model aids in the evolution of dynamic network 980 as presented in at least FIG. 9.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for performing link prediction with spatial and temporal consistency by employing a time-dependent matrix factorization technique, the method comprising:
   developing, at a plurality of timestamps, relational data of a sequence of network structures each including a plurality of nodes;
   learning, by the at least one processor, a feature vector of each node of the plurality of nodes of the sequence of network structures by concurrently optimizing a temporal fitting constraint and a network propagation constraint;
   determining a network structure at each timestamp of the plurality of timestamps;
   determining evolutionary patterns at each of the plurality of timestamps; and
   predicting links in a future network structure based on an evolution of the sequence of network structures within a user-defined sliding window by reducing time complexities of finding neighbors of each node of the plurality of nodes of the sequence of network structures.

2. The method of claim 1, further comprising expressing the temporal fitting constraint as a time-dependent matrix factorization with a network adjacency matrix.

3. The method of claim 2, further comprising maintaining similarities between connected pairs of nodes in a feature space via the network propagation constraint.

4. The method of claim 3, further comprising parameterizing the learned feature vectors with time and employing the learned feature vectors to reconstruct the network structure of the sequence of network structures at each of the plurality of timestamps.

5. The method of claim 1, further comprising adjusting the feature vector of each node of the plurality of nodes of the sequence of network structures based on a feature vector of a neighboring node.

6. The method of claim 1, further comprising expressing the future network structure as a function of time.

7. The method of claim 1, further comprising determining, via an exponential decay function, an importance of a current timestamp of a current structure network with respect to previous timestamps of previous structure networks.

8. The method of claim 1, further comprising determining the user-defined sliding window based on a polynomial function.

9. A system including a dynamic network for performing link prediction with spatial and temporal consistency by employing a time-dependent matrix factorization technique, the system comprising:
   a memory; and
   a processor in communication with the memory, wherein the processor is configured to:
      develop, at a plurality of timestamps, relational data of a sequence of network structures each including a plurality of nodes;
      learn, by the at least one processor, a feature vector of each node of the plurality of nodes of the sequence of network structures by concurrently optimizing a temporal fitting constraint and a network propagation constraint;
      determine a network structure at each timestamp of the plurality of timestamps;
      determine evolutionary patterns at each of the plurality of timestamps; and
      predict links in a future network structure based on an evolution of the sequence of network structures within a user-defined sliding window by reducing time complexities of finding neighbors of each node of the plurality of nodes of the sequence of network structures.

10. The system of claim 9, wherein the temporal fitting constraint is expressed as a time-dependent matrix factorization with a network adjacency matrix.

11. The system of claim 10, wherein the network propagation constraint maintains similarities between connected pairs of nodes in a feature space.

12. The system of claim 11, wherein the learned feature vectors are parameterized with time and employed to reconstruct the network structure of the sequence of network structures at each of the plurality of timestamps.

13. The system of claim 9, wherein the feature vector of each node of the plurality of nodes of the sequence of network structures is adjusted based on a feature vector of a neighboring node.

14. The system of claim 9, wherein the future network structure is expressed as a function of time.

15. The system of claim 9, wherein an exponential decay function determines an importance of a current timestamp of a current structure network with respect to previous timestamps of previous structure networks.

16. The system of claim 9, wherein the user-defined sliding window is determined based on a polynomial function.

17. A non-transitory computer-readable storage medium comprising a computer-readable program for performing link prediction with spatial and temporal consistency by employing a time-dependent matrix factorization technique, wherein the computer-readable program when executed on a computer causes the computer to perform the steps of:
- developing, at a plurality of timestamps, relational data of a sequence of network structures each including a plurality of nodes;
- learning, by the at least one processor, a feature vector of each node of the plurality of nodes of the sequence of network structures by concurrently optimizing a temporal fitting constraint and a network propagation constraint;
- determining a network structure at each timestamp of the plurality of timestamps;
- determining evolutionary patterns at each of the plurality of timestamps; and
- predicting links in a future network structure based on an evolution of the sequence of network structures within a user-defined sliding window by reducing time complexities of finding neighbors of each node of the plurality of nodes of the sequence of network structures.

18. The non-transitory computer-readable storage medium of claim 17, wherein the temporal fitting constraint is expressed as a time-dependent matrix factorization with a network adjacency matrix.

19. The non-transitory computer-readable storage medium of claim 18, wherein the network propagation constraint maintains similarities between connected pairs of nodes in a feature space.

20. The non-transitory computer-readable storage medium of claim 19,
- wherein the future network structure is expressed as a function of time; and
- wherein the user-defined sliding window is determined based on a polynomial function.

* * * * *